(12) United States Patent  (10) Patent No.: US 8,274,003 B2
Lin  (45) Date of Patent: Sep. 25, 2012

(54) BUTTON STRUCTURE

(75) Inventor: Yu-Yuan Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 379 days.

(21) Appl. No.: 12/629,876

(22) Filed: Dec. 2, 2009

(65) Prior Publication Data

US 2011/0079498 A1  Apr. 7, 2011

(30) Foreign Application Priority Data

Oct. 1, 2009 (TW) .............................. 98133406 A

(51) Int. Cl.
*H01H 9/26* (2006.01)
*H01H 13/72* (2006.01)
*H01H 13/76* (2006.01)

(52) U.S. Cl. ....................................................... 200/5 B

(58) Field of Classification Search ................. 200/341, 200/5 B, 302.2, 517, 5 A
See application file for complete search history.

(56) References Cited

U.S. PATENT DOCUMENTS

| 3,691,324 A | * | 9/1972 | Brantingson | ................. | 200/5 E |
| 6,219,038 B1 | | 4/2001 | Cho | | |
| 6,281,887 B1 | * | 8/2001 | Wang | ............... | 345/173 |
| 7,544,904 B2 | * | 6/2009 | Nakatani et al. | ............... | 200/5 A |
| 8,044,315 B2 | * | 10/2011 | Lin et al. | ....................... | 200/345 |
| 2009/0174678 A1 | * | 7/2009 | Mathew et al. | ............... | 345/173 |

FOREIGN PATENT DOCUMENTS

TW  I305891  2/2009

OTHER PUBLICATIONS

"Office Action of Taiwan Counterpart Application", issued on Apr. 5, 2012, p1-p6.

* cited by examiner

*Primary Examiner* — Felix O Figueroa
(74) *Attorney, Agent, or Firm* — Jianq Chyun IP Office

(57) ABSTRACT

A button structure assembled in a button area below a touchpad. The button structure includes a circuit board and a button frame. The circuit board has a first switch and a second switch corresponding to the button area. The button frame has a left side button portion, a right side button portion, and a contacting elastic portion, wherein the left side button portion is corresponding to the first switch, the right side button portion is corresponding to the second switch, and the contacting elastic portion is contacted against the circuit board and between the first switch and the second switch.

11 Claims, 3 Drawing Sheets

BUTTON STRUCTURE

CROSS-REFERENCE TO RELATED APPLICATION

This application claims the priority benefit of Taiwan application serial no. 98133406, filed on Oct. 1, 2009. The entirety of the above-mentioned patent application is hereby incorporated by reference herein and made a part of specification.

BACKGROUND OF THE INVENTION

1. Field of the Invention

The invention generally relates to a button structure and particularly to a button structure applied in a touchpad.

2. Description of Related Art

With the progressing of the portable electronic products, the notebook PC with light weight and portability has already become a standard equipment for young people. Nevertheless, in addition to the looks, the utility function and the operational sensitivity are particularly pursued when buying the notebook PC. In a notebook PC, a related man-machine operation interface, such as a mouse, a trackball, a joystick, a touchpad, a track point or the like, is generally configured for controlling the cursor in the screen to move or drag, picking the application program, or picking the window. The creation of the touchpad facilitates a user to control the location of cursor in the screen and the picking function by merely using the finger to slip on the touchpad and operate according to the button below the touchpad. The touchpad has the same functions as the left button and the right button of the mouse and thus is a very easy creation.

For having the functions of the left button and the right button of the mouse, the left side button and the right side button are generally respectively disposed in the button area, or a button plate incorporated with the left side button and the right side button is disposed in the button area, wherein a fixed shaft is disposed in the center of the button plate. However, during the button plate is pressed by the user to touch the electrical switch, a side of the button plate is moved downward, and the other side of the button plate is lifted upward such that the pressing action is similar to the moving of the seesaw. In order to prevent the seesaw phenomenon and the mis-touch of the button or the dull sensitivity, the thickness of the center of the touchpad is made thinner and fixed by a supporting element in the related art such that the problem that the user simultaneously press the left side button and the right side button to cause both the left side and the right side move together is eliminated.

According to the above-mentioned disadvantages and the problems of the button structure, a concept is provided to efficiently improve the button plate below the touchpad.

SUMMARY OF THE INVENTION

The invention is directed to a button structure to separate the left side button and the right side button by a one-piece button frame to prevent the interference effect.

The invention is directed to a button structure assembled in a button area below a touchpad. The button structure includes a circuit board and a button frame. The circuit board has a first switch and a second switch corresponding to the button area. The button frame has a left side button portion, a right side button portion, and a contacting elastic portion, wherein the left side button portion is corresponding to the first switch, the right side button portion is corresponding to the second switch, and the contacting elastic portion is contacted against the circuit board and between the first switch and the second switch.

In an embodiment of the invention, two opposite ends of the contacting elastic portion are respectively connected with the left side button portion and the right side button portion.

In an embodiment of the invention, the contacting elastic portion is a V-shaped structure.

In an embodiment of the invention, the button frame further has an outer frame connected with the periphery of the left side button portion and the right side button portion. The button frame has an opening for exposing the touchpad. The button frame further has a plurality of fixing portions.

In an embodiment of the invention, the left side button portion has an acting window for accommodating the first switch.

In an embodiment of the invention, the right side button portion has an acting window for accommodating the second switch.

In an embodiment of the invention, the button structure further has a button cover covering the button frame and the circuit board.

In an embodiment of the invention, the button structure further has a supporting plate contacting against the button frame and the circuit board, respectively. The supporting plate is formed integrated and extended to the left side and the right side of the button area, and the two ends of the supporting plate are fixing ends.

In an embodiment of the invention, two elastic arms are disposed on the two ends of the supporting plate.

In view of the above, the button structure of the invention uses the contacting elastic portion contacting the circuit board, and the contacting elastic portion is between the first switch and the second switch. Therefore, the left side button portion and the right side button portion of the button frame are separated by the contacting elastic portion such that the left side button portion and the right side button portion act independently without interfering each other. The seesaw phenomenon and the mis-touch of the button or the unsatisfied touch feeling are prevented, and the problem that the user simultaneously presses the left side button and the right side button to cause both the left side and the right side move together is eliminated.

In order to make the aforementioned and other features and advantages of the invention more comprehensible, several embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
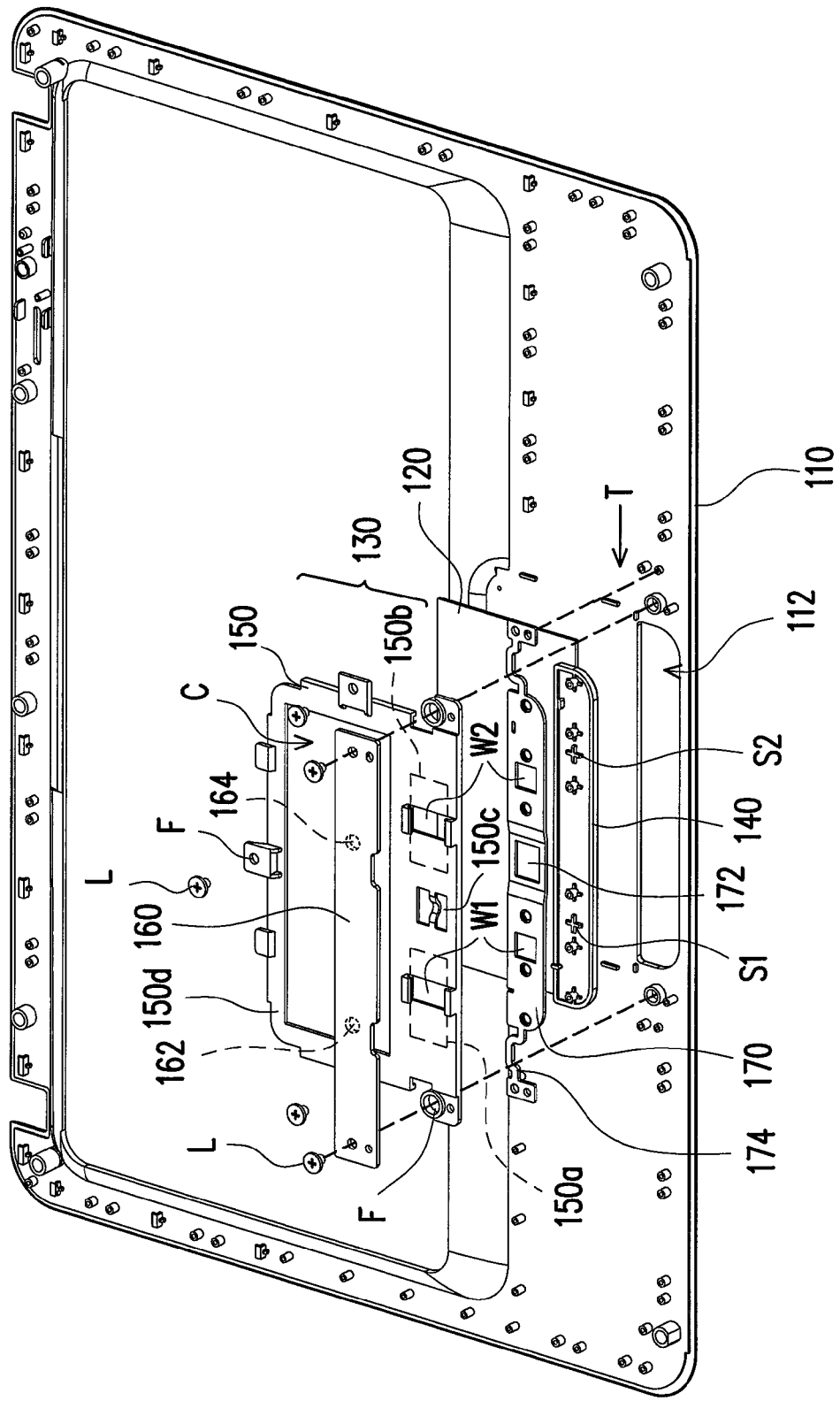
FIG. 1A is a schematic exposing drawing of a button structure of a notebook PC according to an embodiment of the invention.
Figure 1B:
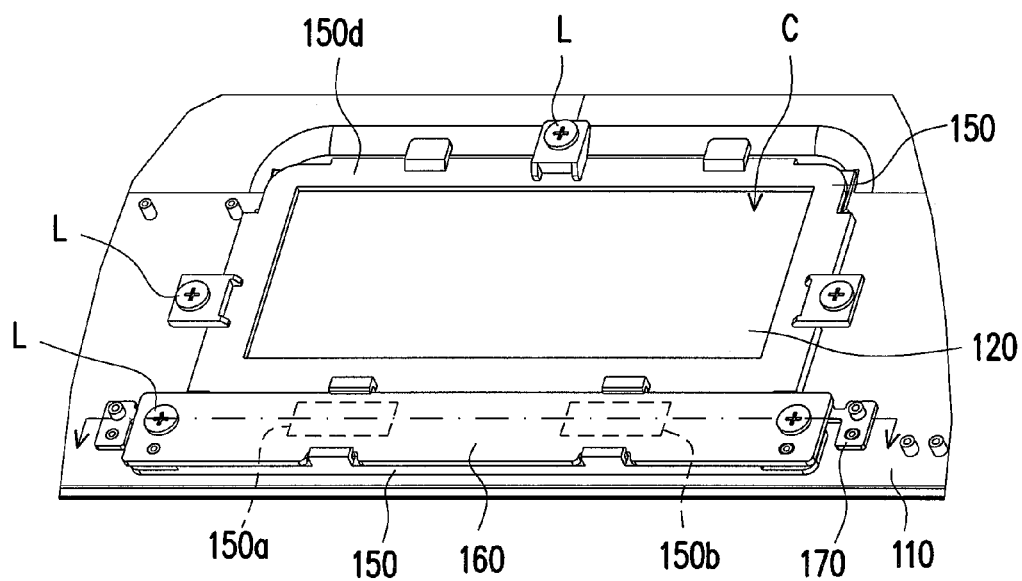
FIG. 1B is a schematic drawing of the assembly of the button structure according to FIG. 1A.
Figure 1C:
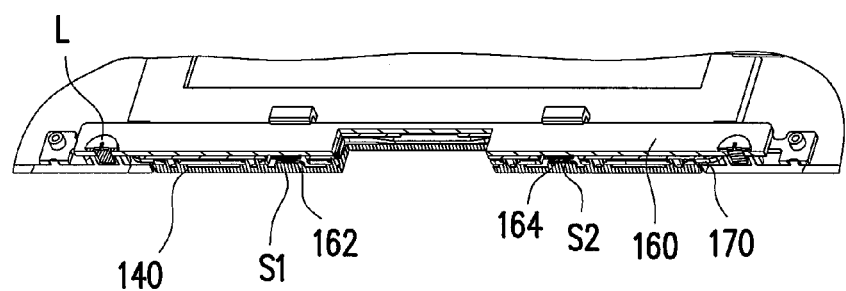
FIG. 1C is a schematic drawing of a cross-section of the button structure according the line I-I of FIG. 1B.

FIG. 1A is a schematic exposing drawing of a button structure of a note book according to an embodiment of the invention, and FIG. 1B is a schematic drawing of the assembly of the button structure according to FIG. 1A. FIG. 1C is a schematic drawing of a cross-section of the button structure according the line I-I of FIG. 1B. A notebook PC has a case 110, a display screen (not shown), a touchpad 120, and a button structure 130. The touchpad 120 and the button structure 130 are respectively assembled on the case 110 such that a user moves or drags the cursor in the screen, picks the program, or picks the window by using a finger to slip on the touchpad 120.

The button structure 130 is assembled in the button area T below the touchpad 120, wherein the function of the button 130 is similar to that of the left button and the right button of a mouse. The button structure 130 at least includes a circuit board 140 and a button frame 150. The circuit board 140 is accommodated in a slot 112 of the case 110. The circuit board 140 and the touchpad 120 are electrically connected to a cursor controller (not shown). The circuit board 140 has a first switch S1 and a second switch S2 such as a push button switch or a piezoelectricity switch, wherein the first switch S1 is located corresponding to the left side of the button area T, and the second switch S2 is located corresponding to the right side of the button area T. When the first switch S1 or the second switch S2 is pressed, the electronic function of the first switch S1 and the second switch S2 is determined by the cursor controller (not shown) so as to picking or opening/closing the program, and their descriptions are omitted here.

In the structure, the button frame 150 is formed integrated and extended to the left side and the right side of the button area T. That is to say, the button frame 150 is extended to the top of the first switch S1 and the second switch S2 of the circuit board 140. In addition, the button frame 150 is divided into a left side button portion 150a, a right side button portion 150b, and a contacting elastic portion 150c. In the present embodiment, the button cover 160 can cover the button area T below the touchpad 120, that is, cover the button frame 150 and the circuit board 140. The left side and the right side of the button cover 160 has, for example, two protruding pillars 162 and 164 as shown in FIG. 1C, which are respectively corresponding to the first switch S1 and the second switch S2. The user is capable of controlling the circuit 140 by pressing the left side and the right side of the button cover 160.

The left side button portion 150a is corresponding to the first switch S1 of the circuit board 140. The right side button portion 150b is corresponding to the second switch S2 of the circuit board 140. The contacting elastic portion 150c is contacted against the circuit board 140 and between the first switch S1 and the second switch S2. Specifically, two opposite sides of the contacting elastic portion 150c respectively connect the left side button portion 150a and the right side button portion 150b. The contacting elastic portion 150c is, for example, a V-shaped structure such that the left side button portion 150a and the right side button portion 150b act independently by taking the contacting elastic portion 150c as a pivot without interfering each other. For the convenience of description, the button frame 150 is specifically described in the following.

Figure 2:
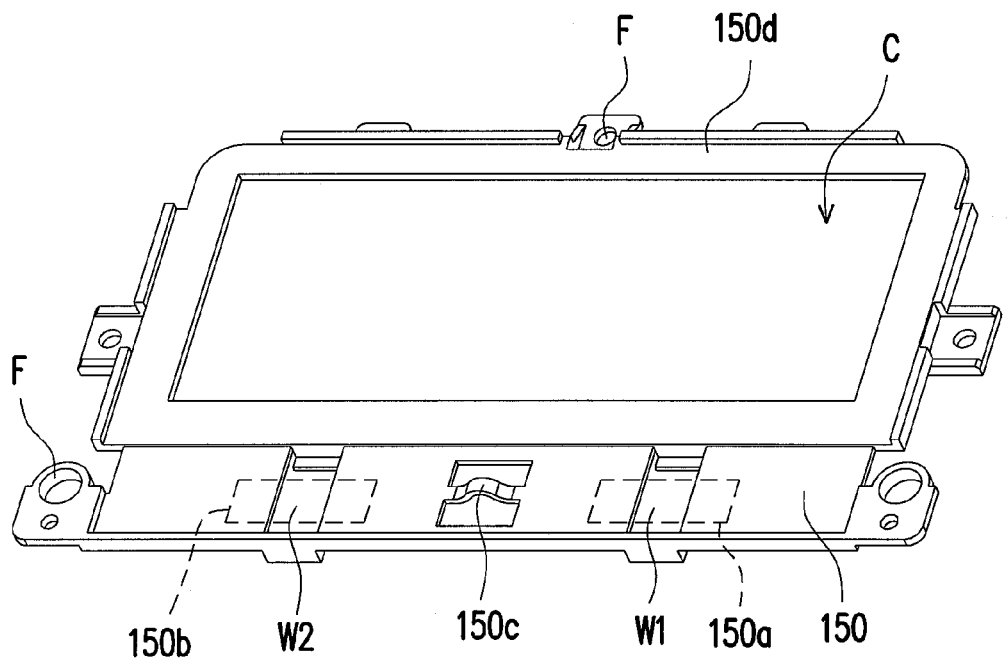
FIG. 2 is a schematic drawing of the button structure of FIG. 1A.

Referring to FIGS. 1A and 2, FIG. 2 is a bottom view of the button structure according to FIG. 1A. The button frame 150 is an openwork plate structure having an outer frame portion 150d connecting with the left side button portion 150a and the right side button portion 150b so that the button frame 150 has an opening C therein. The size of the touchpad 120 is substantially equal to the size of the opening C, and the button frame 150 fixes the touchpad 120 inside the opening C. The button frame 150 further has a plurality of fixing portions F, such as a thread hole or a through hole, for facilitating a fixing piece L to penetrate to be fixed on the case 110 of the notebook PC. When the touchpad 120 is fixed on an outer surface of the case 110 by the button frame 150, a user can perform the operation on the touch area of the touchpad 120 to move the cursor. In addition, the left side button portion 150a has, for example, an acting window W1 corresponding to the first switch S1 so that the protruding pillar 162 of the button cover 160 is located in the acting window W1 and is contacted with the first switch S1 by being pressed. The right side button portion 150b has, for example, the other acting window W2 corresponding to the second switch S2 so that the other protruding pillar 164 of the button cover 160 is located in the acting window W2 and is contacted with the second switch S2 by being pressed.

Figure 3:
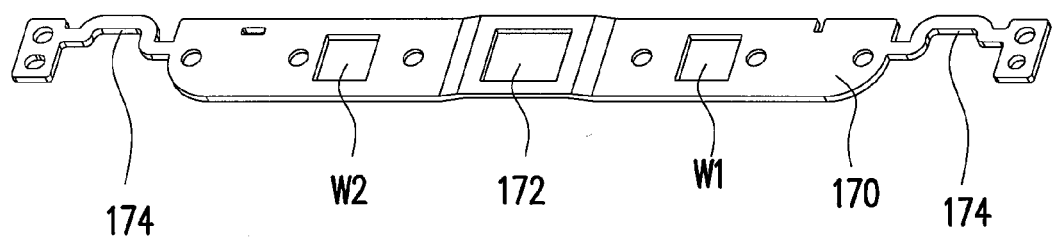
FIG. 3 is a schematic drawing of the supporting plate of FIG. 1A.

Specifically, referring to FIGS. 1A and 3, FIG. 3 is a bottom view of the supporting plate of FIG. 1A. In another embodiment of the invention, the button structure 130 further includes a supporting plate 170 contacting against the button frame 150 and the circuit board 140, respectively. The supporting plate 170 provides a supporting force such that the button frame 150 keeps a proper distance from the circuit board 140 in a normal state to prevent the switch being accidently touched. Furthermore, the supporting plate 170 is apt to enhance the pressing sensitivity to improve the user's touch feeling when performing the operation.

The supporting plate 170 is a bar-like plate having two acting windows W1 and W2, for example. The location and the function of the two acting windows W1 and W2 is corresponding to that of the two acting windows of button frame 150. In addition, an opening 172 is configured at the center of the supporting plate 170, and the contacting elastic portion 150c of the button frame 150 is contacted against the circuit board 140 through the opening 172. The two opposite ends of the supporting plate 170 is fixed on the case 110 through a fixing piece. That is to say, the two opposite ends of the supporting plate 170 are fixing ends. Furthermore, the two opposite ends of the supporting plate 170 are configured with two elastic arms 174 to enhance the elasticity thereof.

In view of the above, the button structure of the invention uses the contacting elastic portion contacting the circuit board, and the contacting elastic portion is between the first switch and the second switch. Therefore, the left side button portion and the right side button portion of the button frame separated by the contacting elastic portion can act independently without interfering each other. The seesaw phenomenon and the mis-touch of the button or the unsatisfied touch feeling are prevented, and the problem that the user simultaneously presses the left side button and the right side button to cause both the left side and the right side move together is eliminated. In addition, the button frame is integrated in structure. Therefore, the user can rapidly assemble the button frame.

Although the invention has been described with reference to the above embodiments, it is apparent to one of ordinary skill in the art that modifications to the described embodiments may be made without departing from the spirit of the invention. Accordingly, the scope of the invention is defined by the attached claims not by the above detailed descriptions.

What is claimed is:

1. A button structure assembled in a button area below a touchpad, the button structure comprising:
   a circuit board having a first switch and a second switch corresponding to the button area;
   a button frame having a left side button portion, a right side button portion, and a contacting elastic portion, wherein the left side button portion is corresponding to the first switch, the right side button portion is corresponding to the second switch, and the contacting elastic portion is contacted against the circuit board and between the first switch and the second switch; and
   a supporting plate contacting against the button frame and the circuit board, respectively.

2. The button structure of claim 1, wherein two opposite ends of the contacting elastic portion are respectively connected to the left side button portion and the right side button portion.

3. The button structure of claim 1, wherein the contacting elastic portion is a V-shaped structure.

4. The button structure of claim 1, wherein the button frame further has an outer frame connected with peripheries of the left side button portion and the right side button portion.

5. The button structure of claim 1, wherein the button frame has an opening for exposing the touchpad.

6. The button structure of claim 1, wherein the button frame further has a plurality of fixing portions.

7. The button structure of claim 1, further comprising a button cover covering the button frame and the circuit board, and the button cover having two protruding pillars respectively corresponding to the first switch and the second switch.

8. The button structure of claim 7, wherein the left side button portion has an acting opening corresponding to the first switch.

9. The button structure of claim 7, wherein the right side button portion has an acting opening corresponding to the second switch.

10. The button structure of claim 1, wherein the supporting plate is integratedly extended to the left side and the right side of the button area, and two opposite ends of the supporting plate are fixing ends.

11. The button structure of claim 1, wherein two ends of the supporting plate are disposed with two elastic arms.

* * * * *